Patented May 15, 1934

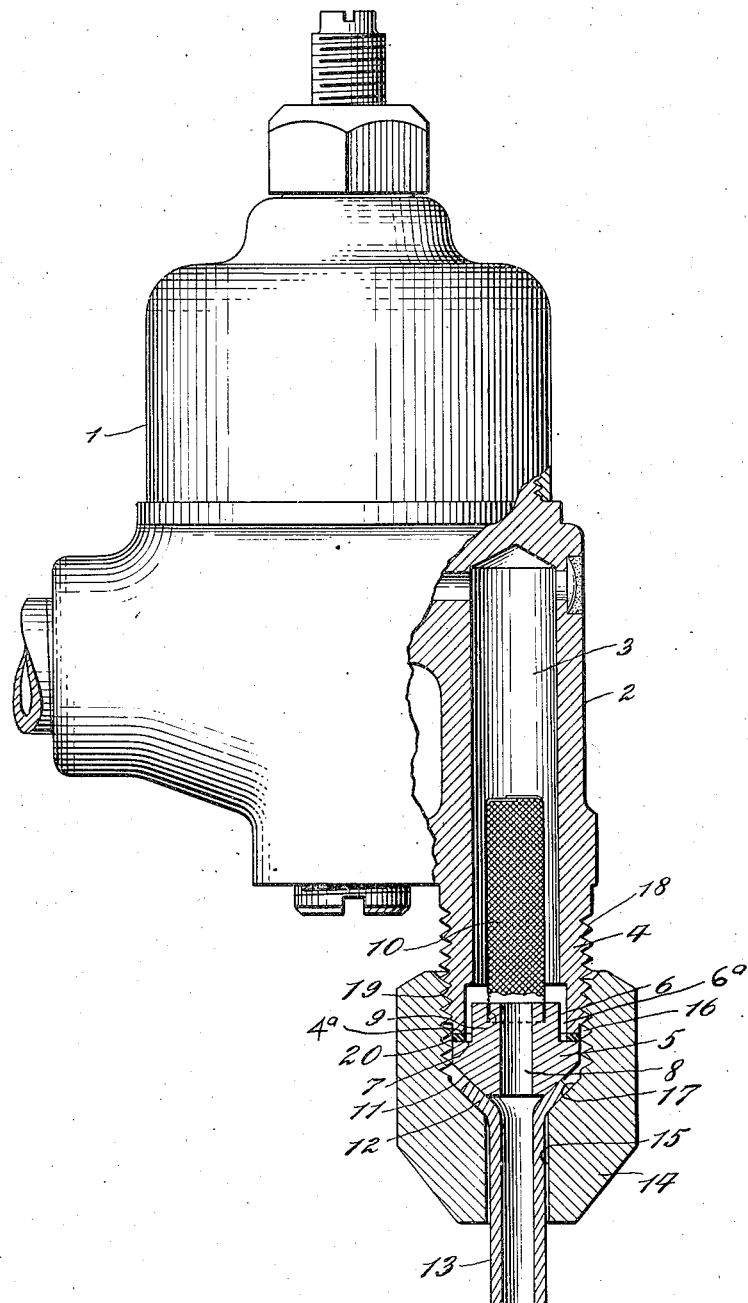

1,959,314

UNITED STATES PATENT OFFICE 1,959,314

COMBINED STRAINER AND TUBE CONNECTION

Daniel D. Wile, Detroit, Mich., assignor to Detroit Lubricator Company, Detroit, Mich., a corporation of Michigan Application July 29, 1931, Serial No. 553,778

2 Claims. (Cl. 210—164)

My invention relates to new and useful improvements in a combined strainer and tube connection which is particularly adapted for use in a refrigeration expansion valve, or other flow control means wherein it is desired to filter or strain the admitted fluid to remove therefrom foreign material or particles which may be carried by the fluid.

An object of my invention is to provide a tube connection having a strainer element in which danger of leakage at the joints is eliminated.

Another object is to provide a strainer element which may be quickly and easily removed for cleaning or replacement.

Another object of my invention is to provide a combined strainer and tube connection which is of simple construction.

The invention consists in the improved construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

The figure is a view in side elevation of a valve casing, partially broken away, and showing my combined strainer and tube connection in longitudinal central section.

Referring to the drawing, 1 designates a valve casing, or the like, that shown being a refrigeration expansion valve having a passageway therethrough. In the side wall portion or member 2 of said casing is a substantially cylindrical, hollow, open-ended bore 3 comprising part of the inlet passage which opens at its inlet end through a substantially cylindrical ported end portion or extension 4 having an end face 4ª in a plane at a right angle to the longitudinal axis of the part 4. Seated on or against the end face 4ª of the end portion 4 is a supporting member 5, which is preferably of brass and substantially cylindrical and of reduced diameter at its inner end, as at 6, to provide an inwardly facing annular shoulder or circumferential flange 7 such that the shoulder seats on the annular end face 4ª of the extension 2, and portion 6 extends into the bore 3. The portion 6 is of less diameter than the bore of the extension 4 so that an annular free space 6ª is provided between said portion 6 and the wall of said bore. Through the member 5 is a passage or aperture 8 which registers and is preferably concentric with the bore 3. In the inner end face of the extension 6 and surrounding the inner, open end of the aperture 8 is a recess 9, preferably circular, in which is seated and rigidly fixed in any suitable manner, one end of a strainer member or element 10, preferably cylindrical and of fine wire mesh such as Monel metal, and which extends into the bore 3 and has its inner free end closed so that the member 10 extends across the aperture 8 to filter flow therethrough. The strainer 10 is of less diameter than the passageway 3, and is substantially centered therein so as to be out of contact with the wall of the passageway, thereby providing an annular free flow space around the screen to receive the filtered material passing through the screen. The outer end of the member 5 which is external of the bore 3 and portion 2, has a substantially conical surface portion 11 converging toward the inlet end of aperture 8. Seated against and partially receiving the portion 11 and conforming thereto, is the flared end portion 12 of a feed tube or conduit member 13, preferably of copper or other relatively soft metal. Slidable on the tube 13 is a coupling member 14, preferably of brass, having a bore 15 therethrough which is of enlarged internal diameter, as at 16, to provide a recess or socket receiving the flared end portion 12, the member 5 and the outer end of extension 2. The base of the recess is preferably substantially conical, as at 17, having its element substantially parallel to the elements of surface portion 11 and abutting the outer face of the flared end portion 12. The extension portion 2 and coupling member 14 are provided with cooperating means, preferably in the form of external and internal screw threads 18, 19, respectively, which are operable upon rotation of member 14 to move member 14 longitudinally onto the portion 2. The member 14 which is in the form of a coupling nut serves upon screwing up of the threads 18, 19 to clamp and seal the end portion 12 tightly to the member 5 and the shoulder of member 5 tightly to the end of portion 2. A gasket or washer 20 of soft copper, or the like, may be inserted between the end of portion 2 and the shoulder 7 to insure a leak-proof joint.

From the foregoing description it will be seen that I have provided a single means, namely, the nut 14, which is operable simultaneously to clamp and seal a strainer member rigidly in operative position and to couple a conduit member with a tight sealed joint to the casing member for the strainer member. It will also be noted that the strainer supporting member which is external of the bore 3 and the casing member, provides a novel finger grip extension by which the strainer may be grasped for withdrawal when the coupling nut for the conduit has been removed or unscrewed from the casing member. The member 14 also serves when screwed into position to center the cylindrical screen longitudinally in the passageway 3, this being assured by the engagement between the member 14 and the adjacent faces of the supporting member 5. The annular space around the extension 6 not only provides for easy insertion and removal of the member 14, but also provides for any slight lateral movement of said member when being assembled, in order to provide for the proper centering or alinement of the screen.

What I claim and desire to secure by Letters Patent of the United States is:

1. A device of the character described, comprising a casing member having a passageway therethrough and a ported end portion opening into said passageway, a supporting member having a reduced end portion projecing into said passageway and having an annular shoulder seating against the end of said ported end portion, said supporting member having an aperture therethrough alined with said passageway, a tubular strainer member projecting into said passageway and having one end secured and sealed to said supporting member, said supporting member projecting externally from said ported end portion to provide a finger grip and terminating in a substantially conical surface, a conduit member having a substantially conical diverging end portion seating against said conical surface, and a coupling nut slidable on said conduit member and having an internal diverging annular shoulder engaging said conduit member end portion, said nut having screw-threaded engagement with said ported end portion whereby to tightly clamp said conduit member to said supporting member and said supporting member to said casing member, and said diverging annular shoulder cooperating with said conical surface to center said supporting member and strainer member relative to said passageway.

2. A device of the character described, comprising a casing member having a passageway therethrough and a ported end portion opening into said passageway, said end portion having an annular end face at right angles to the exit of said passageway, a supporting member having a reduced end portion projecting into said passageway and having an annular shoulder seating against the outer end face of said ported end portion, said reduced end portion being of less diameter than said passageway so as to be spaced laterally therefrom, said supporting member having an aperture therethrough alined with said passageway and having an annular recess in its reduced end portion surrounding said aperture, a cylindrical tubular strainer member projecting into said passageway and having one end secured and sealed in said recess, so as to be rigidly carried by said supporting member, said supporting member projecting from said ported end portion to provide a finger grip external of ported end portion and terminating in a substantially conical surface, a conduit member having a substantially conical diverging end portion seating against said conical surface, and a coupling nut slidable on said conduit member and having an internal diverging annular shoulder engaging said conduit member end portion, said nut having screw-threaded engagement with said ported end portion whereby to tightly clamp said conduit member to said supporting member and said supporting member to said casing member, and said diverging annular shoulder cooperating with said conical surface to center said supporting member and strainer member relative to said passageway.

DANIEL D. WILE.